(12) United States Patent
Gan

(10) Patent No.: US 10,465,841 B1
(45) Date of Patent: Nov. 5, 2019

(54) APPARATUS TO EXPOSE AND ALLOW RETRACTION OF A MODULE OF AN ELECTRONIC DEVICE

(71) Applicant: HONGFUJIN PRECISION ELECTRONICS (CHONGQING) CO., LTD., Chongqing (CN)

(72) Inventor: Wen-Lin Gan, Chongqing (CN)

(73) Assignee: HONGFUJIN PRECISION ELECTRONICS (CHONGQING) CO., LTD., Chongqing (CN)

( * ) Notice: Subject to any disclaimer, the term of this patent is extended or adjusted under 35 U.S.C. 154(b) by 0 days.

(21) Appl. No.: 16/021,472

(22) Filed: Jun. 28, 2018

(30) Foreign Application Priority Data

Apr. 17, 2018 (CN) .......................... 2018 1 0345165

(51) Int. Cl.
*G03B 17/00* (2006.01)
*F16M 13/02* (2006.01)
*G03B 17/56* (2006.01)
*F16H 19/04* (2006.01)

(52) U.S. Cl.
CPC ........... *F16M 13/02* (2013.01); *G03B 17/561* (2013.01); *F16H 19/04* (2013.01); *F16M 2200/025* (2013.01)

(58) Field of Classification Search
CPC ...... G03B 15/006; G03B 17/561; G02B 7/08; F16M 2200/025
See application file for complete search history.

(56) References Cited

U.S. PATENT DOCUMENTS 7,435,018 B2 * 10/2008 Huang .................. G03B 17/04
348/373
2004/0130655 A1 * 7/2004 Yanakawa ............ H04N 5/2251
348/373

\* cited by examiner

*Primary Examiner* — Minh Q Phan
(74) *Attorney, Agent, or Firm* — ScienBiziP, P.C.

(57) ABSTRACT

An apparatus for driving out a camera module between a locked position and an unlocked position includes a moving assembly, a mounting board, a self-locking switch, and an elastic element. The moving assembly slidably connects with the mounting board. The elastic element can be compressed on retraction to then drive out the moving assembly when released. The camera module when driven out is in an unlocked position.

9 Claims, 6 Drawing Sheets

APPARATUS TO EXPOSE AND ALLOW RETRACTION OF A MODULE OF AN ELECTRONIC DEVICE

FIELD

The subject matter herein generally relates to electronic device modules.

BACKGROUND

A camera can be fixed at an upper end of an electronic device and protrude from the surface of the electronic device housing. When the camera lens is not used, the camera lens may still protrude from the surface of the housing, which may expose the camera lens to be damaged.

BRIEF DESCRIPTION OF THE DRAWINGS

Implementations of the present disclosure will now be described, by way of example only, with reference to the attached figures.

DETAILED DESCRIPTION

Figure 1:
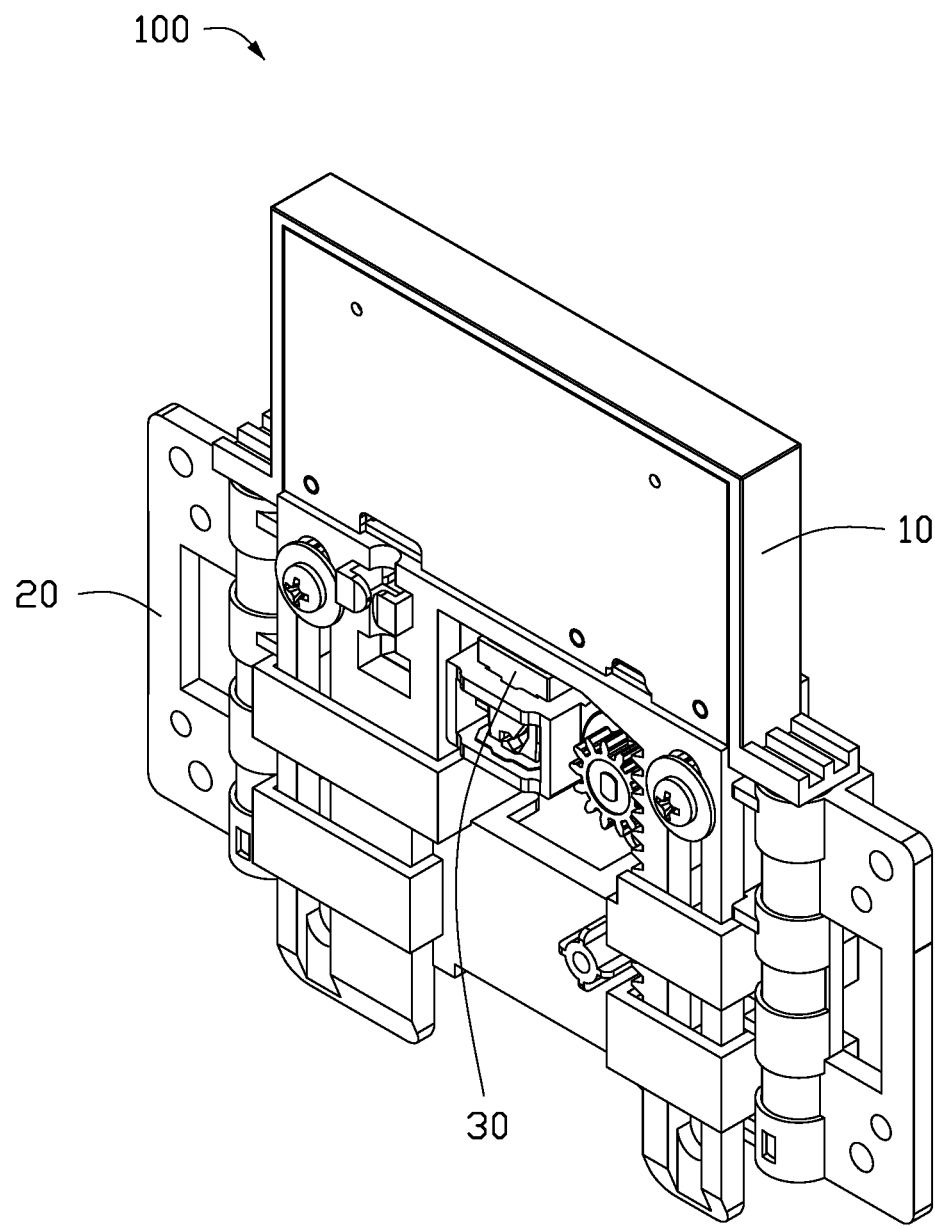
FIG. 1 is an isometric view illustrating an exemplary embodiment of an elevating apparatus assembled.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 2:
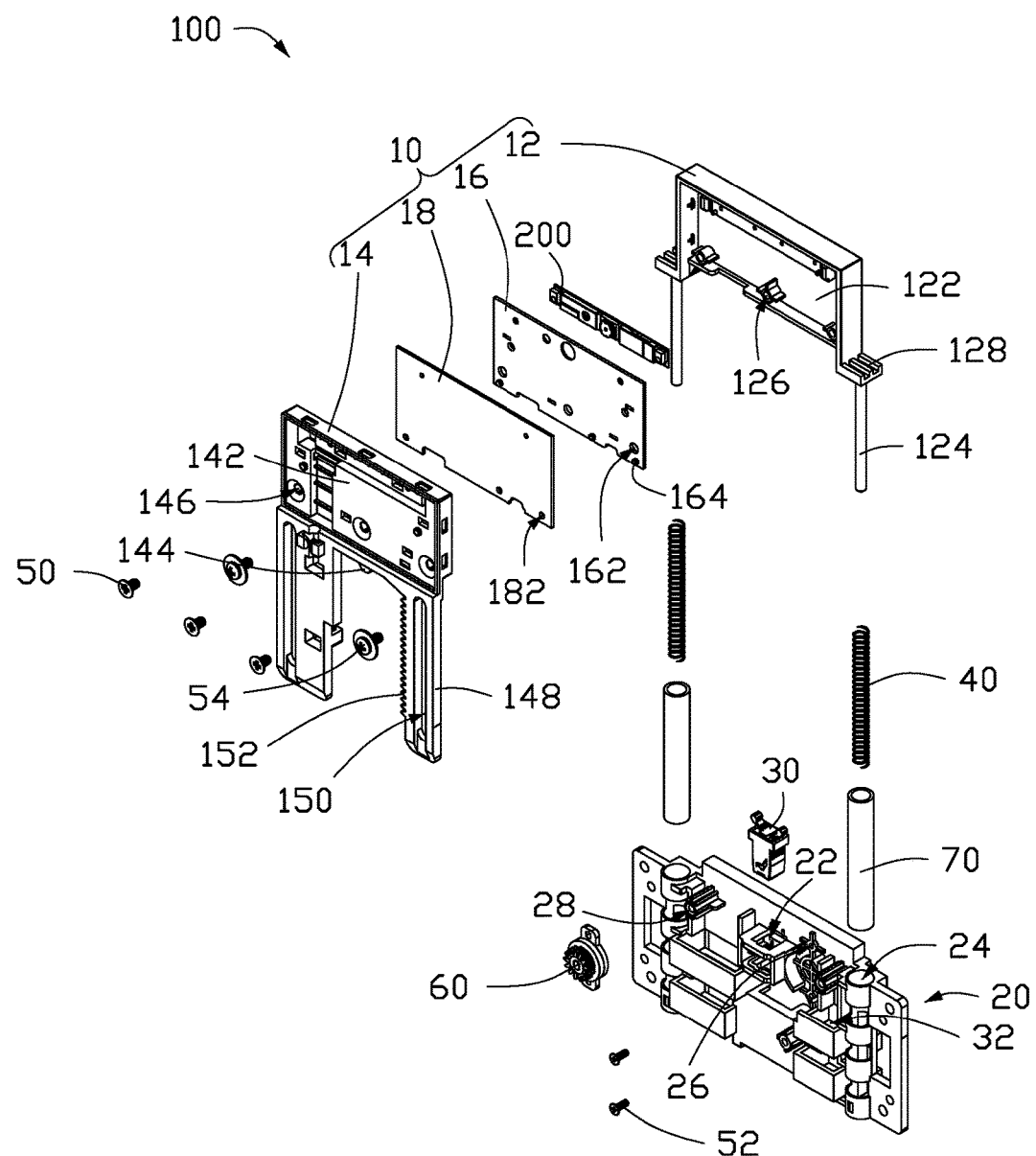
FIG. 2 is an exploded view illustrating the elevating apparatus of FIG. 1, including a first mounting bracket, a second mounting bracket, and a dampening member.
Figure 3:
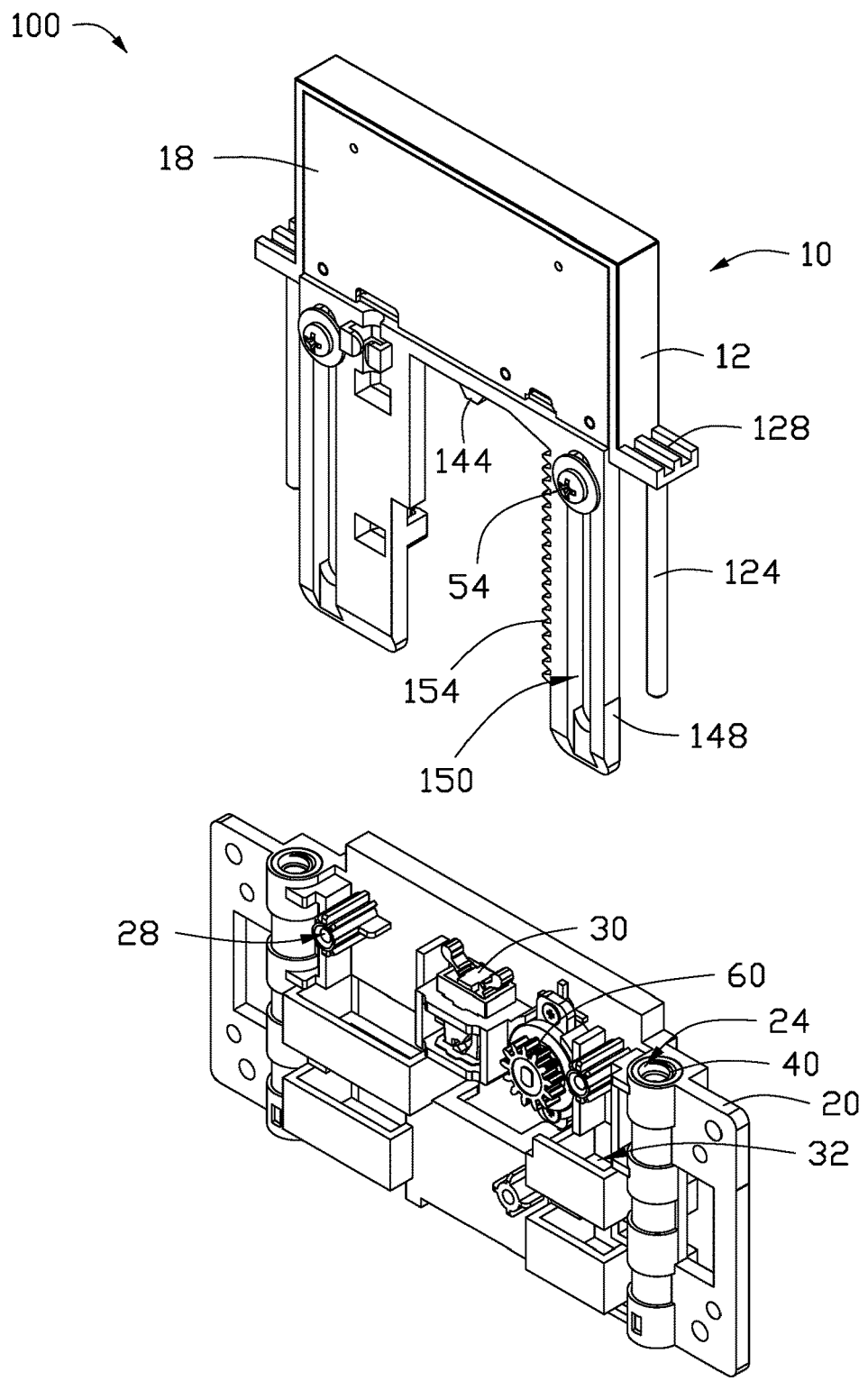
FIG. 3 is an isometric view illustrating the elevating apparatus of FIG. 1.
Figure 4:
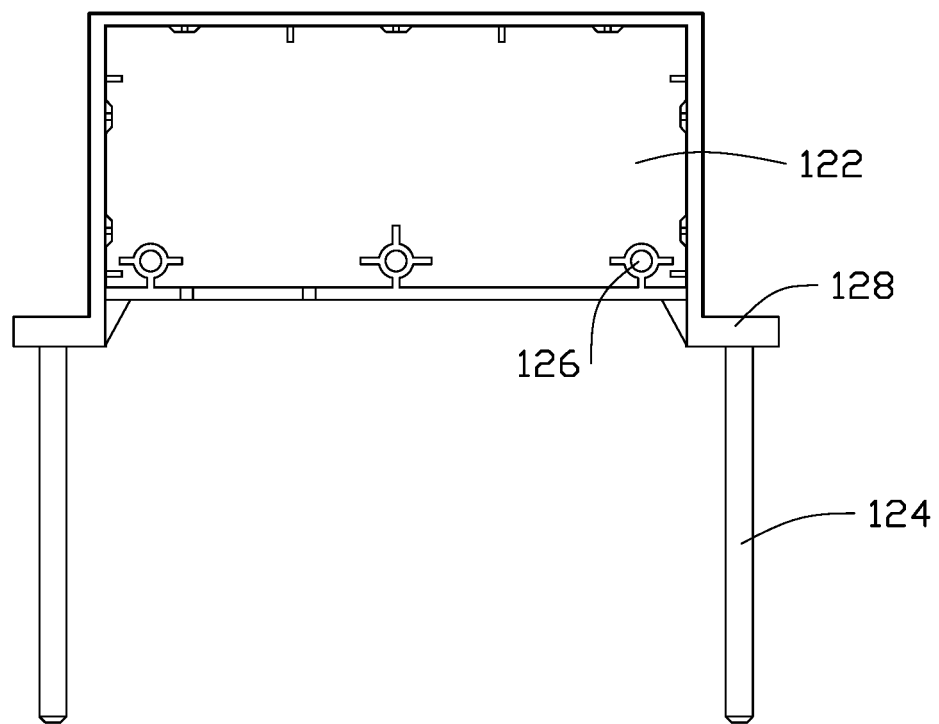
FIG. 4 is an isometric view illustrating the first mounting bracket of FIG. 2.
Figure 5:
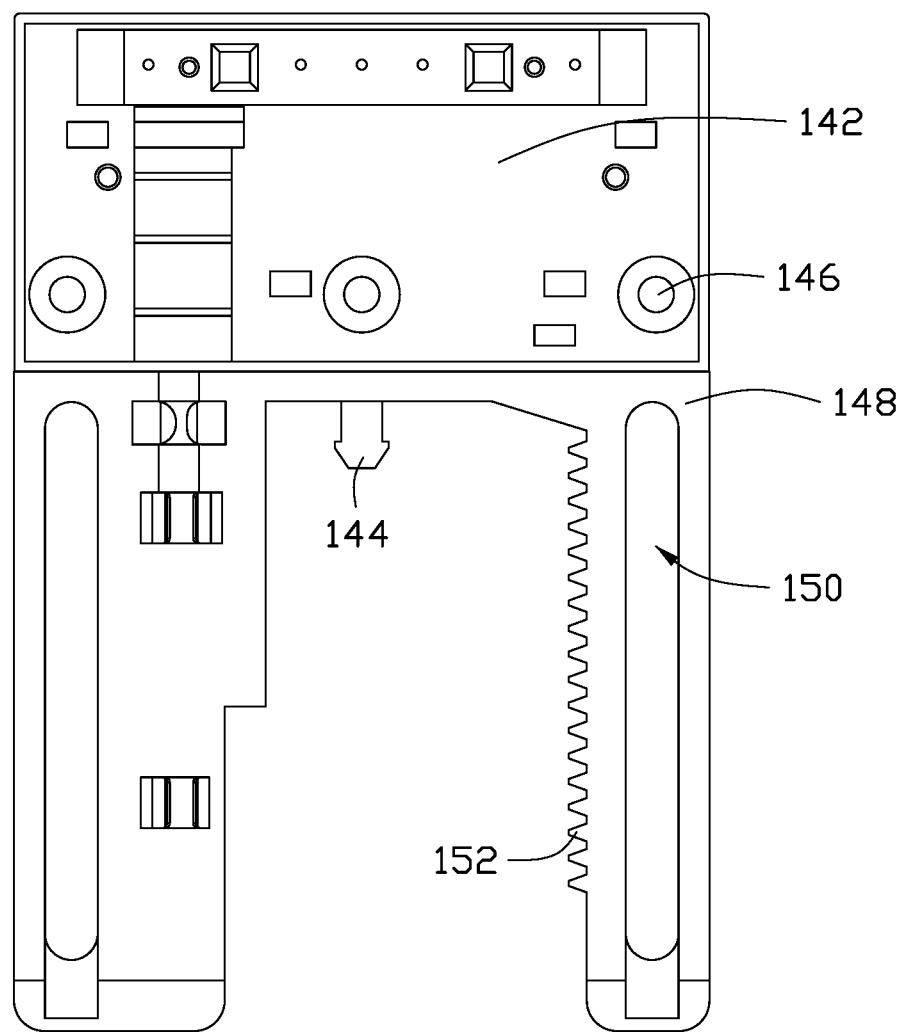
FIG. 5 is an isometric view illustrating the second mounting bracket of FIG. 2.

FIG. 1 and FIG. 2 illustrate an elevating apparatus 100 in an exemplary embodiment.

The elevating apparatus 100 includes a moving assembly 10, a mounting board 20, a self-locking switch 30, and two elastic elements 40 (shown in FIG. 2). The moving assembly 10 is slidably connected to the mounting board 20.

FIGS. 2-5 illustrate that the moving assembly 10 includes a hook 144 and two guiding columns 124. The moving assembly 10 drives a camera module 200 to move between a locked position and an unlocked position. The hook 144 corresponds to the self-locking switch 30. The two elastic elements 40 are respectively sleeved on the two guiding columns 124. The camera module 200 includes a plurality of electronic components (not shown in figures) used for imaging.

The mounting board 20 includes a receiving groove 22. The mounting board 20 also defines two receiving channels 24 and two mounting holes 26 in the mounting board 20. The receiving groove 22 receives the self-locking switch 30. The two guiding columns 124 respectively correspond to the two receiving channels 24, the two guiding columns 124 can slide into the two receiving channels 24. Two mounting holes 26 are defined in the mounting board 20.

When the moving assembly 10 is pressed down towards the mounting board 20, the hook 144 is pressed against the self-locking switch 30, so that the hook 144 is locked to the self-locking switch 30. When the moving assembly 10 is pushed towards the mounting board 20, the two guiding columns 124 can move into the two receiving channels 24 and deform the two elastic elements 40. Thus, the camera module 200 can be in a locked position. The self-locking switch 30 can be realized by the "self-locking switch 20" in the Chinese patent CN102331076A.

When the moving assembly 10 is pressed down towards the mounting board 20 again, the hook 144 presses the self-locking switch 30 to release the hook 144 from the self-locking switch 30. The elastic element 40 drives the two guiding columns 124 to move in the two receiving channels 24 under the action of the released deformation, and the moving assembly 10 is driven to move. Thus, the camera module 200 can be in an unlocked position.

In at least one exemplary embodiment, the moving assembly 10 includes a first mounting bracket 12 and a second mounting bracket 14. The first mounting bracket 12 includes a first supporting plate 122, and two sides of the first supporting plate 122 extend downward to form the two guiding column 124.

The guiding column 124 includes a pressing portion 128. The pressing portion 128 connects to the first supporting plate 122, and the pressing portion 128 is configured to press against and deform the elastic element 40.

The second mounting bracket 14 includes a second supporting plate 142. A top of the second supporting plate 142 connects to the camera module 200, and a bottom of the second supporting plate 142 extends downward to form the hook 144.

In at least one exemplary embodiment, the moving assembly 10 can further include a mounting plate 16 and three fastening members 50. Three mounting holes 126 are defined in the first supporting plate 122, three through holes 146 are defined in the second supporting plate 142, and three through holes 162 are defined in the mounting plate 16. The three mounting holes 126 correspond to the three through holes 146 and to the three through holes 162. The three fastening members 50 can pass through the three through holes 146 and the three through holes 162 to lock in the three mounting holes 126. Thus, the first supporting plate 122, the second supporting plate 142, and the mounting plate 16 can be fixedly connected together. In addition, the first mounting bracket 12 and the second mounting bracket 14 can be fixedly connected together.

In at least one exemplary embodiment, the moving assembly 10 can further include a covering plate 18, three through holes 182 being defined in the covering plate 18. The mounting plate 16 can include three protrusions 164, and the three protrusions 164 match the three through holes 182. Thus, the covering plate 18 and the mounting plate 16 can be fixedly connected together.

In at least one exemplary embodiment, the elevating apparatus 100 further includes two sleeve members 70. The sleeve members 70 can be sleeved on the guiding columns 124 and the two elastic elements 40.

In at least one exemplary embodiment, a length of the sleeve member 70 is less than a length of the elastic element 40 in its natural state. Thus, the force given to and received from the elastic element 40 is substantially uniform, and the length of the elastic element 40 is slightly longer than the length of the sleeve member 70. Accordingly, the pressing portion 128 on the guiding column 124 can press against the elastic element 40.

In at least one exemplary embodiment, the elastic element 40 can be a spring.

In at least one exemplary embodiment, the elevating apparatus 100 can further include two fastening members 54. Two mounting holes 28 are defined in the mounting board 20. The second mounting bracket 14 further includes two guiding plates 148. A bottom of the second supporting plate 142 extends downward to form the two guiding plates 148. The guiding plate 148 defines a guiding groove 150, and the two fastening members 54 match the two mounting holes 28 and are slidable in the two guiding grooves 150.

In at least one exemplary embodiment, the elevating apparatus 100 further includes a dampening member 60 and two fastening members 52.

Figure 6:
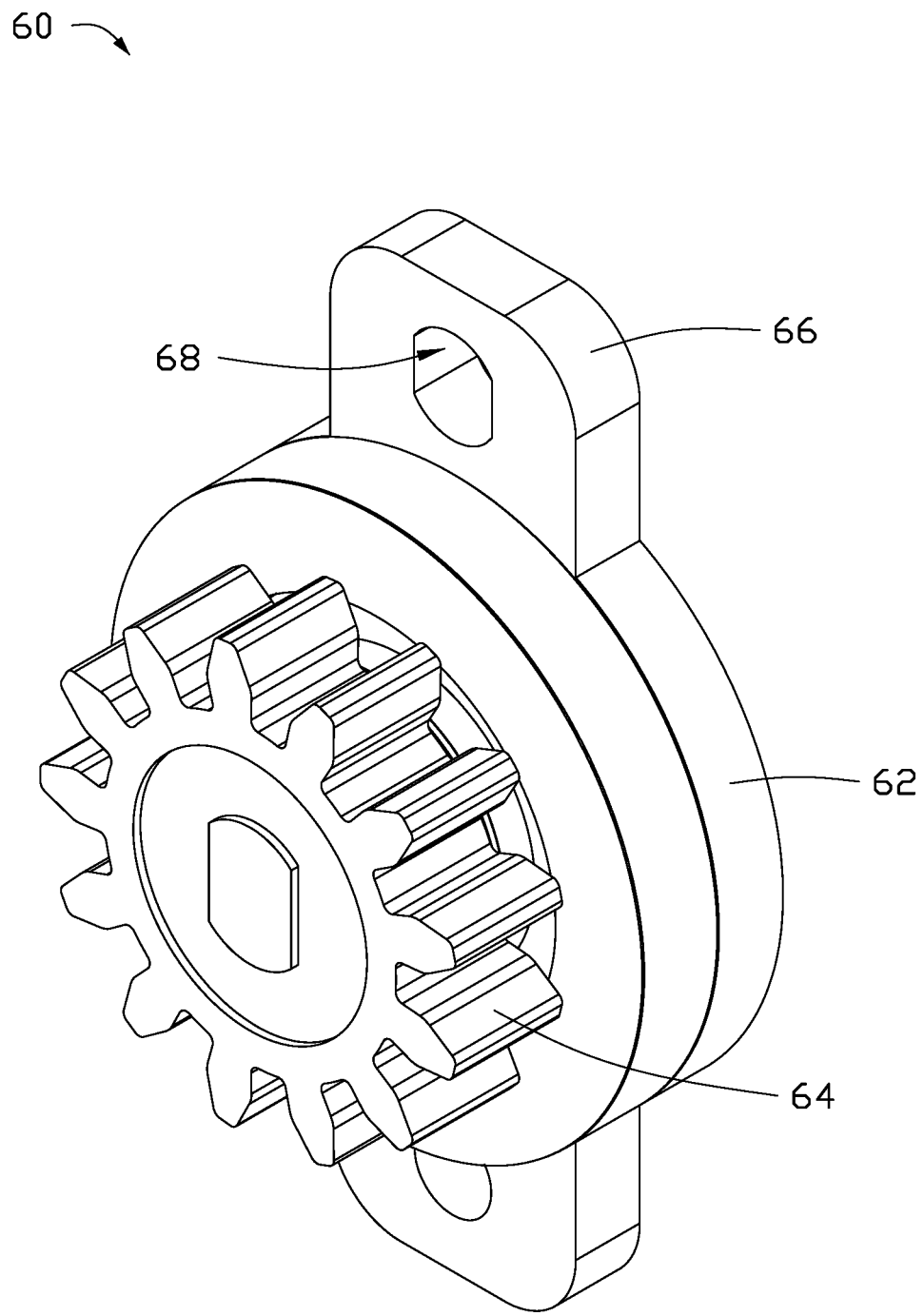
FIG. 6 is an isometric view illustrating the dampening member of FIG. 2.

FIG. 2 and FIG. 6 illustrate that the dampening member 60 can include a main portion 62 and a gear 64. The gear 64 is fixedly connected with the main portion 62. Two extending portions 66 extends from sides of the main portion 62, and both two extending portions 66 defines a through hole 68. The two through holes 68 cooperate with the two mounting holes 26. Thus, the two fastening members 52 can pass through the two through holes 68 to be locked in the two mounting holes 26, and the dampening member 60 can be fixedly connected to the mounting board 20.

In at least one exemplary embodiment, the guiding plate 148 matches with the gear 64. The guiding plate 148 can include a plurality of teeth 152, and the plurality of teeth 152 meshes with the gear 64 to allow a dampening effect.

When the moving assembly 10 is ejected by the restoring force of the elastic elements 40, the plurality of teeth 152 meshes with the gear 64 to provide the dampening effect. Thus, the moving assembly 10 can be prevented from moving too fast.

In at least one exemplary embodiment, the three fastening members 50, 52, and 54 are screws. The three mounting holes 126, 26, and 28 are screw holes.

In at least one exemplary embodiment, the moving assembly 10 further defines two limiting grooves 32, which match with the two guiding plates 148. The two guiding plates 148 can move within the two limiting grooves 32. The two guiding grooves 150 and the two limiting grooves 32 guide and limit the movement of the moving assembly 10.

When the top of the second mounting bracket 14 is pressed, the hook 144 will press the self-locking switch 30 to lock the hook 144 with the self-locking switch 30. The two pressing portions 128 press against and deform the two elastic elements 40. Thus, the camera module 200 is in a locked position.

When the top of the second mounting bracket 14 is pressed again, the hook 144 will press the self-locking switch 30 again to release the hook 144 from the self-locking switch 30. The elastic elements 40 will drive the guiding column 124 out of the receiving channel 24. Thus, the camera module 200 is in an unlocked position.

When the elastic elements 40 drive the guiding column 124 outside the receiving channel 24, the guiding plate 148 can only move within the limiting groove 32. Thus, the range of movement of the moving assembly 10 can be limited.

The exemplary embodiments shown and described above are only examples. Many details are often found in the art such as the other features of elevating apparatus. Therefore, many such details are neither shown nor described.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An elevating apparatus configured for driving a camera module to move between a locked position and an unlocked position and comprising:
   a moving assembly comprising a hook and a guiding column, the moving assembly fixing the camera module;
   a self-locking switch matching with the hook and an elastic element sleeving on the guiding column; and
   a mounting board comprising a receiving groove and a receiving channel, the receiving channel matching with the guiding column, and receiving groove receiving the self-locking switch;
   wherein when the moving assembly is pressed, the hook presses self-locking switch to lock the hook with the self-locking switch, the guiding column slides in the receiving channel and presses the elastic element to generate elastic deformation; and
   wherein when the moving assembly is pressed again, the hook presses self-locking switch to release the hook from the self-locking switch, and the elastic element drives the moving assembly to move; and
   wherein the moving assembly comprises a first mounting bracket, the first mounting bracket comprises a first supporting plate, and a side of the first supporting plate extends downward to form the guiding column;
   wherein the moving assembly further comprises a second mounting bracket, the second mounting bracket comprises a second supporting plate, a top of the second supporting plate connects to the camera module, and a bottom of the second supporting plate extends downward to form the hook.

2. The elevating apparatus of claim 1, wherein the moving assembly further comprises a mounting plate and a first fastening member, a first mounting hole is defined in the first supporting plate, a first through hole is defined in the second supporting plate, and a second through hole is defined in the mounting plate; the first mounting hole is corresponded to the first through hole and the second through hole, and the first fastening member passes through the first through hole and the second through hole in order to be locked in the corresponding the first mounting hole.

3. The elevating apparatus of claim 2, wherein the elevating apparatus further a dampening member and a second fastening member, the mounting board defines a second mounting hole, the dampening member comprises a main portion and a gear, and the gear connects to the main portion; an extending portion extends from the main portion, the extending portion defines a third through hole, the third through hole matches with the second mounting hole, and the second fastening member passes through the third through hole to be locked in the second mounting hole.

4. The elevating apparatus of claim 3, wherein the elevating apparatus further a third fastening member, the mounting board further defines a third mounting hole, the second mounting bracket further comprises a guiding plate, the guiding plate defines a guiding groove, the third fastening member matches with the third mounting hole and slides connect to the guiding groove.

5. The elevating apparatus of claim 4, wherein the guiding plate matches with the gear, the guiding plate comprises a plurality of teeth, and the plurality of teeth meshes with the gear to generate a dampening effect.

6. The elevating apparatus of claim 5, wherein the mounting board defines a limiting groove, and the limiting groove matches with the guiding plate.

7. The elevating apparatus of claim 5, wherein the first fastening member is a screw, the second fastening member is a screw, and the third fastening member is a screw.

8. The elevating apparatus of claim 7, wherein the first mounting hole is a screw hole, the second mounting hole is a screw hole, and the third mounting hole is a screw hole.

9. The elevating apparatus of claim 1, wherein the elevating apparatus further comprises a sleeve member, the sleeve member is sleeved on the guiding column and the elastic element.

* * * * *